United States Patent [19]

Burkin et al.

[11] 4,198,377

[45] Apr. 15, 1980

[54] PROCESS FOR RECOVERING MANGANESE FROM AQUEOUS ACIDIC SULPHATE SOLUTIONS

[75] Inventors: Alfred R. Burkin, Brentwood; Kevork A. Chouzadjian, London, both of England

[73] Assignee: Interox Chemicals Limited, London, England

[21] Appl. No.: 937,833

[22] Filed: Aug. 29, 1978

[30] Foreign Application Priority Data

Sep. 17, 1977 [GB] United Kingdom ............... 38832/77

[51] Int. Cl.$^2$ .................... C01G 45/00; C01G 9/06
[52] U.S. Cl. ..................... 423/50; 423/101; 423/140; 423/52; 423/544; 423/558
[58] Field of Search ............ 423/50, 52, 544, 101, 423/140, 558

[56] References Cited

U.S. PATENT DOCUMENTS

| | | | |
|---|---|---|---|
| 4,067,789 | 1/1978 | Harris et al. | 423/50 |
| 4,096,233 | 6/1978 | Bodson | 423/544 |
| 4,156,711 | 5/1979 | Bodson | 423/544 |

FOREIGN PATENT DOCUMENTS 550346 12/1957 Canada ...................... 423/544

*Primary Examiner*—Herbert T. Carter
*Attorney, Agent, or Firm*—Larson, Taylor and Hinds

[57] ABSTRACT

The present invention relates to a process for the recovery of manganese from aqueous acidic solution.

The process comprises the steps of, (a) introducing into the solution peroxymonosulphuric acid (PMS) in a plurality of stages, normally from 2 to 6, often in the range of from 110 to 160% of the amount theoretically needed to oxidise the manganese to the Mn (IV) oxidation state, (b) introducing from 100 to 133% of the theoretical amount of neutralising agent to neutralise the PMS introduced in step (a), preferably in a single addition and prior to the introduction of the second stages of PMS and, (c) separating precipitated manganese salt from solution. The demanganisation reaction is preferably carried out at a temperature of above 60° C. usually in the range of 70° to 90° C.

An aqueous acidic manganese-containing solution can be obtained by leaching ores or scrap metal with strong mineral acids. The present invention is particularly suitable for the purification of zinc sulphate solution.

15 Claims, No Drawings

PROCESS FOR RECOVERING MANGANESE FROM AQUEOUS ACIDIC SULPHATE SOLUTIONS

The present invention relates to a process for the recovery of manganese from aqueous acidic solutions.

Aqueous acidic manganese-containing solutions can be obtained conventionally by leaching ores with strong mineral acids, usually sulphuric acid. The manganese can be present either as the main metallic constituent or as an impurity in a solution of some other metal. In the latter case, recovery of manganese from solution is in effect a purification of the solution of that other metal. In Canadian Patent 550346, assigned to Hudson Bay Mining and Smelting Co. Ltd. there is described a process for purifying aqueous zinc sulphate solutions comprising the addition of a peroxyacid together with sufficient neutralising agent to maintain the pH at or above a given level, preferably at least pH4, since precipitation occurs to a lessening extent at a lower pH. A similar process is described by Societe des Mines et Fonderies de la Vielle Montagne in Belgian Patent 830450. We have confirmed that when the amount of neutralising agent added is of the same order as the amount needed to solely neutralise the peroxyacid added, then single stage addition of the peroxyacid results in very poor precipitation of the manganese salt. However, the use of such a small amount of neutralising agent would otherwise be attractive since it would allow the alkali, e.g. ammonia, to be removed by precipitation as a Jarosite salt. Consequently, we have sought ways of improving the extent of precipitation at the low addition level of neutralising agent.

According to the present invention there is provided a process for recovering manganese from an aqueous acidic solution comprising the steps of:

(a) introducing into the solution peroxymonosulphuric acid in a plurality of stages;

(b) introducing neutralising agent into solution in one or more stages and in a total amount of from 100% to 133% of the stoichiometric amount needed to neutralise all the peroxymonosulphuric acid introduced in step (a), and (c) separating thereafter precipitated manganese salt from solution.

By adding the peroxymonosulphuric acid (referred to hereinafter as PMS) in stages instead of in a single stage the utilisation of acid and the proportion of manganese precipitated (believed to be manganese dioxide) can be improved.

The present invention is particularly suited to the purification of zinc sulphate-containing solutions by the removal from them of minor but significant amounts of manganese, since it enables the monovalent neutralising agent to be precipitated out by way of a Jarosite salt and thus allows the convenient eventual recycle of the sulphate solution. In such solutions the weight ratio of zinc to manganese is often at least 10:1, and frequently from 15:1 to 50:1. It will be recognised that the manganese concentration in such solutions is initially often in the range of 5 to 20gpl, but the invention can be employed with similar success if the manganese concentration is initially outside that range. Other metals that can be present in a solution from which manganese dioxide is precipitated by the present invention process, include cobalt and nickel, in which case the solution is preferably maintained at a pH of not above 3 after some of the PMS has been added, and iron in which case the solution acidity is likewise preferably maintained at a pH of not above 1 after some of the PMS has been added. In some instances as in solutions obtained from leaching scrap alloys the weight ratio of cobalt plus nickel to manganese is above 50:1 but in other instances manganese is the main metal and the other metals are present as impurities.

For practical reasons, the number of stages of PMS introduction is normally in the range of 2 to 6 and frequently is 3 or 4. Preferably, sufficient time is allowed between each stage to permit the precipitation of manganese salt to reach approximately the maximum or at least the major proportion obtainable from that stage. In practice, a very high proportion of the manganese salt precipitates with five minutes of the addition of the first stage and ten minutes for subsequent stages. Thus, in a convenient manner of operation, the second stage of PMS addition is from 5 to 30 minutes and often 5 to 20 minutes after the first stage, and third and subsequent stage is from 10 to 30 minutes and often from 10 to 20 minutes after the preceding stage of PMS addition. The proportion of PMS in each stage (expressed as a proportion of the total amount of PMS introduced) can clearly vary depending upon the total number of stages employed, one suitable arrangement being a substantially even amount in each stage. It is possible to employ less than the even amount in the first stage, but we have found it can be desirable to bias the distribution in favour of the first stage, in many embodiments the amount of PMS in the first stage being as much or nearly as much as in all the other stages together or even slightly more. Consequently, at least 20% of the PMS is normally introduced in the first stage and frequently no more than 60%, in many cases the amount being from 30% to 60%, and a convenient amount being e.g. 30 to 50%. Although there are many ways of distributing the remaining amount of PMS amongst the remaining stages, one convenient method often employed is to distribute the remaining amount evenly in discrete additions, but such an even method is not essential as can be seen from the following lists of suitable distributions included by way of examples:

2 stages: 40:60; 50:50; 60:40
3 stages: 25:37.5:37.5; 33.3:33.3:33.3; 40:30:30; 40:40:20; 50:25:25; 50:30:20; 60:20:20
4 stages: 25:25:25:25; 40:20:20:20; 50:20:15:15

It will be recognised that analagous distributions can be drawn up in respect of addition of the PMS in five or more stages. Distributions in which the amount of PMS in the first stage is greater than in any individual subsequent stage are preferred.

It is highly desirable to introduce at least a stoichiometric amount of PMS—i.e. an amount which could theoretically remove all the manganese from solution. In practice the amount of PMS is often in the range of 110% to 160% of the stoichiometric amount, frequently about 120% to 133%. Much higher amounts of PMS could be introduced, if desired, but generally would not result in sufficient additional manganese removal to justify the additional cost of the reagent. Less PMS than the stoichiometric amount can be used provided that higher manganese residual level in the solution is tolerable. From the foregoing passage it will be recognised that in practice the concentration of manganese in solution is first measured so as to enable the appropriate amount of PMS to be calculated.

It will be recognised that one alternative way of describing the amount of PMS introduced in each of the various stages is based upon the proportion of the stoichiometric amount, rather than upon the total amount used. Thus, when expressed in that alternative way, it is preferred to introduce from 40 to 67% of the stoichiometric amount of PMS in the first stage.

The PMS solution can be used at the concentration at which it is produced, usually in the range of 20 to 80% by weight, or alternatively it can be diluted to below 20% by weight, if desired. A preferred concentration is of at least 40% by weight. It is more convenient to use the PMS solution relatively quickly after its production, since its performance can be impaired unless it is stored under conditions which prevent or significantly retard the change in composition of the PMS solution. It is believed that the deleterious change possibly results from an increase in hydrogen peroxide content which occurs to a lesser extent as the PMS solution is stored at below 0° C. On a plant scale, the installation and running of large cooled vessels is not undertaken unless really necessary.

In the present invention the amount of neutralising agent is limited to not more than approximately that which can neutralise the PMS, i.e. addition of up to 133% of the stoichiometric amount is possible without departing from the spirit of the present invention. It is preferable for the neutralising agent to be added in a single stage rather than in a plurality of stages, the timing of the addition being preferably prior to the second stage of addition of the PMS, particularly where greater than an aliquot part of PMS is added in the first stage. It also seems desirable for the neutralising agent to be introduced rapidly rather than over a lengthy period of time. Clearly, the constraints of the equipment employed dictate to a certain extent how nearly the rapid introduction of neutralising agent is achieved. The neutralising agent can conveniently be selected from ammonium hydroxides, alkali metal hydroxides and alkaline earth metal hydroxides/hydroxides of sodium, potassium and ammonium are particularly suitable since the cations lend themselves to precipitation at a later stage in the form of Jarosite salt. Concentrated aqueous solutions of the neutralising agent are generally preferable, but where the water balance of any cycle, of which demanganisation forms a part, is likely to be a problem, other forms can be considered, for example gaseous ammonia.

The demanganisation reaction is preferably carried out at a temperature of above 60° C., up to the boiling point of the solution, and in practice usually in the range of 70° C. to 90° C. It is a feature of the present invention that such temperatures can be employed. Where a single stage addition of PMS in at least a stoichiometric amount plus only enough neutralising agent, e.g. ammonia, to neutralise the PMS is employed, the precipitate formed initially tends to be re-dissolved, especially at a temperature of 50° C. or higher resulting in very poor demanganisation, but where under the same conditions, the PMS is introduced in stages much improved demanganisation is achievable. The demanganisation reaction can be carried out at ambient pressure, even at several thousand feet above sea level, but pressurised vessels can be used if desired.

It has been found highly desirable to employ PMS solutions in which the amount of hydrogen peroxide is very low. In practice, some hydrogen peroxide will always be present in aqueous solution, but by suitable control of the manufacture of the PMS solution, weight ratios of at least 30:1 of PMS to hydrogen peroxide can be obtained, such solutions being preferable.

The demanganisation can be effected in batch fashion, or continuously where, for example, PMS and neutralising agent e.g. ammonia are injected at appropriate points into a pipeline along which e.g. zinc sulphate solution is flowing.

The PMS can conveniently be produced by reacting concentrated hydrogen peroxide with gaseous sulphur trioxide or liquid sulphuric acid of oleum. Preferably the hydrogen peroxide solution employed contains at least 60% and more preferably at least 80% $H_2O_2$ by weight. Preferably where liquid sulphuric acid or oleum is employed, its sulphate content, expressed as $SO_3$, is high, very desirably at least 80% by weight, so that in combination with the concentrated hydrogen peroxide, concentrated PMS can be obtained. For practical reasons it is preferable to employ the $SO_3$ and $H_2O_2$ in an equimolar molar ratio or to employ an excess of $SO_3$, often up to 100% e.g. 50% or 70% above the equimolar amount.

Having described the invention in general terms, specific embodiments will now be disclosed in more detail by way of example. Comparisons 1 to 3 are not according to the invention and are present by way of comparison only.

In the Tables, the time is the time after addition of the first or only stage of PMS, and the % pptn is the percentage of manganous ion that has precipitated out of solution. The initial pH of zinc sulphate treated in Comparisons 1 to 3 and Examples 1 to 4 and 11 and 12 was 2.41, measured at 25° C. In Examples 5 to 10 the pH was adjusted to pH 4.0, measured at 25° C. with zinc calcine prior to addition of the PMS solution.

Comparison 1

In this comparison, the zinc sulphate solution initially contained 7.09 gpl manganous ions and was treated in a single stage at a temperature of 50° C. with 110% of the stoichiometric amount of PMS solution having the composition $H_2SO_5$ 10.9%, $H_2S_2O_8$ <0.3% and $H_2O_2$ 1.02% by weight. The total amount of ammonia to neutralise all the PMS was 3.5 ml of 0.88 ammonia which was added dropwise to the zinc sulphate solution over the period shown in Table 1, together with the pH, $Mn^{2+}$ concentration and % of manganese precipitated. It was observed that the initial precipitate redissolved shortly after the 5 minute sample had been taken for analysis but reprecipitated during the course of further addition of ammonia.

TABLE 1

| Time min | $Mn^{++}$ g/l | pH | Vol $NH_4OH$ added ml | % pptn |
|---|---|---|---|---|
| 5 | 6.2 | 1.55 | 0.5 | 9.6 |
| 15 | 6.2 | 2.0 | 3.0 | 9.6 |
| 20 | 6.0 | 2.1 | 3.5 | 12.5 |
| 30 | 5.9 | 2.0 | 3.5 | 14.0 |
| 40 | 5.65 | 1.85 | 3.5 | 17.6 |

Comparison 2

In this comparison, the zinc sulphate solution was treated at 90°–100° C. with PMS prepared from 86% $H_2O_2$ and 28–30% oleum to give a low $H_2O_2$ content in the solution used. 110% of the stoichiometric amount of PMS was used and immediately neutralised with only sufficient 0.88 ammonia in one dose. The results are summarised in Table 2.

TABLE 2

| Time min | 0 | 5 | 15 | 20 | 30 | 40 | 50 | 60 |
|---|---|---|---|---|---|---|---|---|
| $Mn^{++}$ g/l | 6.55 | 3.75 | 3.35 | 3.25 | 3.25 | 3.15 | 3.10 | 3.00 |
| % pptn | | 42.9 | 49 | 50.5 | 50.5 | 52.1 | 52.8 | 54.3 |

Comparison 3

In this comparison, a similar method to Comparison 2 was followed except that 115% of the stoichiometric amount of PMS was used, and 2.0 ml of ammonia added immediately, the remainder (1.5 ml) being added after 5 minutes. The initial precipitation dissolved very quickly. The results are summarised in Table 3.

TABLE 3

| Time min | 0 | 5 | 15 | 20 | 30 | 40 | 50 | 60 |
|---|---|---|---|---|---|---|---|---|
| $Mn^{++}$ g/l | 6.72 | 5.85 | 5.8 | 5.65 | 5.5 | 5.35 | 5.35 | 5.30 |
| % pptn | — | 12.9 | 13.7 | 15.9 | 18.8 | 20.4 | 20.4 | 21 |

EXAMPLE 1

In this Example the zinc sulphate solution was treated at 90° C. with 110% of the stoichiometric amount of PMS diluted to 10% by weight, half being introduced at time 0 and half straight after the 30 minute sample. The entire amount of PMS added was neutralised with ammonia in a single introduction just after the first stage of PMS addition. The results are summarised in Table 4, the % pptn for the second stage of PMS addition being based upon the manganous ion concentration measured immediately the PMS was introduced (3.38 gpl).

TABLE 4

| Time min | $Mn^{++}$ g/l | pH | % pptn |
|---|---|---|---|
| 0 | 7.3 | | |
| 5 | 4.05 | 1.15 | 44.3 |
| 10 | 3.80 | 0.95 | 47.9 |
| 15 | 3.80 | 0.95 | 47.9 |
| 20 | 3.70 | 0.95 | 49.3 |
| 25 | 3.70 | 1.0 | 49.3 |
| 30 | 3.65 | 1.05 | 50.0 |
| | 3.38 | | |
| 35 | 2.45 | 0.9 | 27.5 |
| 40 | 2.05 | 0.9 | 39.4 |
| 45 | 1.95 | 0.85 | 42.3 |
| 50 | 1.85 | 0.7 | 45.2 |

From Table 4 it can be calaculated that >71% of the manganous ion present initially could be precipitated using this method whereas, in comparison 2, only 54% was precipitated using exactly the same amount of reagents.

EXAMPLE 2

The method of Example 1 was followed except that the ammonia was also added in two stages, half as in Example 1 and half immediately after the second stage of PMS addition. The results are summarised in Table 5.

TABLE 5

| Time min | $Mn^{++}$ g/l | pH | % pptn |
|---|---|---|---|
| 0 | 7.3 | 3.8 | |
| 5 | 5.7 | 1.4 | 21.9 |
| 10 | 5.68 | 1.05 | 22.2 |
| 15 | 5.65 | 1.15 | 22.6 |
| 20 | 5.60 | 1.05 | 23.3 |
| 25 | 5.55 | 1.05 | 24.0 |
| 30 | 5.50 | 1.05 | 24.7 |
| | 5.06 | | |
| 35 | 5.25 | 1.00 | |
| 40 | 5.20 | 0.90 | 0.9 |
| 45 | 5.10 | 0.90 | 2.9 |
| 50 | 5.00 | 1.00 | 4.8 |
| 55 | 5.00 | 1.00 | 4.8 |
| 60 | 4.75 | 1.00 | 9.5 |

From Table 5 it will be seen that a total of 35% of the manganous ion precipitated out of solution. In comparison 3, however, using slightly more PMS, much less precipitation (21%) occurred. It can therefore be deduced from this Example not only that addition of PMS in two stages is beneficial, but that where a high proportion of the total amount of PMS is added in the first stage, it is beneficial to add all the ammonia at or during the first stage.

EXAMPLE 3

In this Example, a similar method to Example 1 was employed, except that the PMS (which had been freshly prepared) was added in four equal portions at 15 minute intervals. All the ammonia required to neutralise the PMS (4.4 ml of 0.88 ammonia) was added straight after the first stage addition of PMS. The results are summarised in Table 6.

TABLE 6

| Time min | $Mn^{++}$ g/l | pH | Eh mV | % pptn | Cumulative pptn |
|---|---|---|---|---|---|
| 0 | 7.62 | 3.8 | | | |
| 5 | 4.80 | 1.80 | 925 | 37 | |
| 10 | 4.75 | 1.80 | 905 | 37.7 | |
| 15 | 4.75 | 1.85 | 880 | 37.7 | |
| | 4.57 | | | | |
| 20 | 3.75 | 1.25 | 1035 | 17.8 | |
| 25 | 3.35 | 1.25 | 1025 | 26.5 | 56% |
| 30 | 3.35 | 1.25 | 1025 | 26.5 | |
| | 3.22 | | | | |
| 35 | 2.80 | 1.10 | 1081 | 13 | |
| 40 | 2.45 | 1.00 | 1066 | 23.9 | |
| 45 | 2.30 | 0.90 | 1066 | 28.6 | 70% |
| | 2.21 | | | | |
| 50 | 1.62 | 0.8 | 1113 | 26.7 | |
| 55 | 1.50 | 0.8 | 1101 | 32.1 | |
| 60 | 1.45 | 0.75 | 1096 | 34.4 | |

From Table 6 it can be seen that 76% of the manganous ion present initially was precipitated showing a detectable improvement over Example 1 where the PMS was added in only two stages.

EXAMPLE 4

In this Example the method of Example 3 was followed with the sole exception of using PMS solution that had been stored for three hours at ambient temperature prior to use. The results are summarised in Table 7.

TABLE 7

| Time min | $Mn^{++}$ g/l | pH | Eh mV | % pptn |
|---|---|---|---|---|
| 0 | 7.62 | 3.8 | | |
| 5 | 5.10 | 1.45 | 990 | 33.1 |
| 10 | 4.80 | | 990 | 37.0 |
| 15 | 4.75 | 1.40 | 988 | 37.7 |
| | 4.56 | | 1047 | |
| 20 | 4.35 | 1.20 | 1048 | 4.5 |
| 25 | 4.05 | 1.15 | 1049 | 11.2 |
| 30 | 4.05 | 1.10 | 1045 | 11.2 |
| | 3.89 | | 1081 | |
| 35 | 3.60 | 1.00 | 1083 | 7.5 |
| 40 | 3.35 | 0.95 | 1079 | 13.9 |
| 45 | 3.20 | 0.95 | 1073 | 17.7 |
| | 3.07 | | 1110 | |
| 50 | 2.80 | 0.90 | 1105 | 8.8 |
| 55 | 2.62 | 0.90 | 1101 | 14.7 |
| 60 | 2.55 | 0.75 | 1098 | 16.9 |

In all 60% of the manganous ion was precipitated out so that from a comparison of Tables 6 and 7 it will be seen that freshly prepared PMS performed much more effectively than even three hours old PMS.

EXAMPLES 5 TO 12

In each of these Examples, zinc sulphate solution (280 ml) containing 6.6 gpl manganous ion was treated at 80° C. with PMS solution freshly prepared from 86% w/w $H_2O_2$ and 30% oleum to give the concentrations of PMS and $H_2O_2$ shown in Table 8. The PMS solution was added in three equal batches, the first after time 0, the second after 20 minutes and the third after 40 minutes. The entire amount of 0.88 ammonia was added straight after the first stage of PMS addition. The amounts of PMS employed and the results obtained are summarised in Table 8. In Examples 7 and 8, some extra hydrogen peroxide was added to give ratio to PMS shown. In Tables 8 and 9, PMS:$Mn^{2+}$ ratio given is expressed as a percentage of the stoichiometric amount of PMS, and figures for precipitation after various stages are given after 20 minutes for the first stage, 40 minutes for the second and 60 minutes for the third.

TABLE 8

| Example No. | PMS Solution % $H_2SO_5$ | % $H_2O_2$ | ratio $H_2SO_5/H_2O_2$ | PMS: $Mn^{2+}$ ratio | % pptn after (stages) 1st | 2nd | 3rd |
|---|---|---|---|---|---|---|---|
| 5 | 57.7 | 1.9 | 30.4 | 230 | 33.3 | 58.3 | 77.3 |
| 6 | 58 | 1.3 | 44.6 | 133 | 36.4 | 62.9 | 81.0 |
| 7 | 58 | 3.0 | 19.3 | 133 | 28.0 | 55.3 | 73.5 |
| 8 | 58 | 5.0 | 11.6 | 133 | 40.2 | 56.8 | 68.9 |
| 9 | 59 | 1.6 | 36.9 | 133 | 44 | 69.7 | 84.1 |
| 10 | 59 | 1.6 | 36.9 | 160 | 39.4 | 57.6 | 72 |
| 11 | 60.5 | 1.3 | 46.5 | 133 | 42.4 | 68.2 | 86.4 |
| 12 | 60.5 | 1.3 | 46.5 | 160 | 43.9 | 75 | 90.9 |

From Table 8 it can be seen that those Examples using PMS solution which contained a low ratio of PMS to hydrogen peroxide in general produced poorer demanganisation than similar Examples in which the PMS to hydrogen peroxide ratio was higher.

EXAMPLES 13–25

In each of these Examples, zinc sulphate solution (280 ml, pH 2.41 at 25° C.) containing 6.6 gpl manganous ions was treated in three stages (except 22) with PMS solution made as in Examples 5 to 12. In all these Examples 120% of the stoichiometric amount of PMS was used, in proportions and at times shown in Table 9, except in Example 22 where in the second stage PMS was added slowly but continuously, over a period of 25 minutes. The entire amount of 0.88 ammonia (4.4 ml) was added rapidly in a single stage after the first PMS addition in Examples 13 to 18 and 21, 22, but in Examples 19 and 20 the ammonia was added in discrete amounts of respectively 0.5 ml each two minutes, and 0.5 ml each minute until 4.5 ml had been added, and in Examples 23 to 25 the entire amount of ammonia was added immediately after the addition of the second stage PMS. The process conditions including temperature of the zinc sulphate solution and results are summarised in Table 9.

TABLE 9

| Example No. | Temp 0° C. | PMS Solution % $H_2SO_5$ | % $H_2O_2$ | wt ratio $H_2SO_5/H_2O_2$ | PMS Addition % in stages 1 | 2 | 3 | Time of Stages 1 | 2 | 3 | Demanganisation % pptn after stage 1 | 2 | 3 |
|---|---|---|---|---|---|---|---|---|---|---|---|---|---|
| 13 | 70 | 58.9 | 1.2 | 49.1 | 33.3 | 33.3 | 33.3 | 0 | 15 | 35 | 39.2 | 61.1 | 77.1 |
| 14 | 75 | 58.9 | 1.2 | 49.1 | 33.3 | 33.3 | 33.3 | 0 | 15 | 35 | 39.4 | 60.1 | 79.1 |
| 15 | 80 | 58.9 | 1.2 | 49.1 | 33.3 | 33.3 | 33.3 | 0 | 15 | 35 | 33.9 | 58.2 | 77.3 |
| 16 | 90 | 58.6 | 1.12 | 52.3 | 33.3 | 33.3 | 33.3 | 0 | 15 | 35 | 36.2 | 57.6 | 76.2 |
| 17 | 80 | 58.6 | 1.12 | 52.3 | 20 | 40 | 40 | 0 | 15 | 35 | 28.8 | 59.4 | 79.4 |
| 18 | 80 | 58.6 | 1.12 | 52.3 | 60 | 20 | 20 | 0 | 25 | 40 | 59.4 | 72.1 | 83.5 |
| 19 | 80 | 57.8 | 1.18 | 49.0 | 40 | 30 | 30 | 0 | 20 | 35 | nm | nm | 72.7 |
| 20 | 80 | 57.8 | 1.18 | 49.0 | 40 | 30 | 30 | 0 | 20 | 35 | nm | nm | 72.7 |
| 21 | 80 | 57.7 | 1.2 | 48.1 | 40 | 30 | 30 | 0 | 20 | 35 | nm | nm | 81.8 |
| 22 | 80 | 57.7 | 1.2 | 48.1 | 60 | 40(cont)- | | 0 | 25 to 50- | | 53.8 | 70.5 | — |
| 23 | 80 | 57.7 | 1.2 | 48.1 | 20 | 40 | 40 | 0 | 15 | 35 | 11.1 | 52.9 | 73.8 |
| 24 | 80 | 57.3 | 1.32 | 43.4 | 40 | 30 | 30 | 0 | 20 | 35 | 13.3 | 44.4 | 63.5 |
| 25 | 80 | 57.3 | 1.32 | 43.4 | 60 | 20 | 20 | 0 | 25 | 40 | 11.8 | 28.2 | 45.8 |

From Table 9 it can be seen that the demanganisation can be effected successfully over a range of from 70° to 90° C., and that very good results could be obtained where greater than a third part of PMS was used in the first stage and all the ammonia was added in a single stage.

A comparison of Examples 18 and 22 demonstrated that it was beneficial to add the remainder of PMS in two stages rather than as a continuous addition. A comparison of Examples 19, 20 and 21 show the benefit of adding the ammonia rapidly rather than over a period of either 18 or 9 minutes, and Examples 23 to 25 clearly show that the effect of adding the ammonia in the second, rather than in the first stage of PMS addition becomes increasingly marked as the proportion of PMS used in the first stage increases from 20 to 60%.

EXAMPLES 26 TO 28

In each of these Examples, zinc sulphate solution (280 ml, pH 2.41 at 25° C.) containing 6.6 gpl manganous ions was treated in three stages with fresh 39% by weight PMS solution made from 20% oleum and 70% $H_2O_2$, the proportions in the stages being 40:30:30. Sufficient neutralising agent in aqueous solution to neutralise the total amount of PMS was added in one batch straight after the first addition of PMS. The treatment was effected at 80° C. The results are summarised in Table 10.

TABLE 10

|  | Neutralising Agent | % pptn after 3rd Stage |
|---|---|---|
| 26 | KOH | 70.6 |
| 27 | Ca(OH)$_2$ | 63.7 |
| 28 | NH$_4$OH | 64.0 |

We claim:

1. A process for recovering manganese from an aqueous acidic sulphate solution containing manganese and one or more of zinc, nickel, cobalt and iron comprising the steps of:
   (a) introducing into the solution at least a stoichiometric amount of peroxymonosulphuric acid to oxidise the manganese to the Mn (IV) oxidation state in from 2 to 6 stages, each stage of introduction of the peroxymonosulphuric acid being followed by an ageing period of from 5 to 30 minutes between the first and second stages of introduction and of from 10 to 30 minutes between subsequent stages of introduction, if any, during which manganese salt precipitates from solution, from 20 to 60% of the peroxymonosulphuric acid being introduced in the first stage and the remainder being introduced in the subsequent stages,
   (b) introducing neutralising agent into solution in one or more stages and in a total amount of from 100% to 133% of the stoichiometric amount needed to neutralise all the peroxymonosulphuric acid introduced in step (a), all the neutralising agent being introduced before at least the last 40% of the peroxymonosulphuric acid is introduced,
   (c) maintaining the solution at a temperature of at least 60° C. during steps (a) and (b) and
   (d) separating thereafter precipitated manganese salt from solution.

2. A process according to claim 1 wherein the peroxymonosulphuric acid is introduced in 3 or 4 stages.

3. A process according to claim 1 wherein the total amount of peroxymonosulphuric acid introduced into solution is from 110 to 160% of the stoichiometric amount theoretically required to oxidise all the manganese in solution to the Mn (IV) oxidation state.

4. A process according to claim 3 wherein the total amount of peroxymonosulphuric acid introduced into solution is from 120 to 133% of the stoichiometric amount required theoretically to oxidise all the manganese in solution to the Mn (IV) oxidation state.

5. A process according to claim 3 or 4 wherein the proportion of peroxymonosulphuric acid introduced in the first stage is from 30 to 60% of the total amount introduced.

6. A process according to claim 1 wherein all the neutralising agent is introduced in a single stage.

7. A process according to claim 1 wherein all the neutralising agent is introduced prior to the second stage of introduction of the peroxymonosulphuric acid.

8. A process according to claim 6 or 7 wherein the neutralising agent is introduced between the first and second stages of introduction of peroxymonosulphuric acid.

9. A process according to claim 1 wherein the neutralising agent is in the form of an aqueous solution of ammonium, sodium or potassium hydroxide.

10. A process according to claim 1 wherein the temperature of the aqueous manganese-containing solution is maintained in the range of 70° to 90° C. during introduction of the peroxymonosulphuric acid.

11. A process according to claim 1 wherein the manganese-containing solution additionally contains one or more metals selected from zinc, cobalt, nickel and the solution is maintained at below pH3 after the first stage of introduction of peroxymonosulphuric acid.

12. A process according to claim 1 wherein the solution contains additionally iron and the solution is maintained at a pH of below 1 after the first stage of addition of peroxymonosulphuric acid.

13. A process according to claim 1 wherein the peroxymonosulphuric acid employed is present in a weight ratio to hydrogen peroxide of at least 30:1.

14. A process for recovering manganese from an aqueous acidic sulphate solution containing manganese and one or more of zinc, nickel, cobalt and iron comprising the steps of introducing into the solution from a 110 to 160% of the stoichiometric amount of permonosulphuric acid to oxidise all the manganese to the Mn (IV) oxidation state in total and sufficient neutralising agent to neutralise the peroxymonosulphuric acid by first introducing into solution from 30 to 50% of the peroxymonosulphuric acid, then immediately introducing all the neutralising agent, from 5 to 30 minutes thereafter introducing from one half to two thirds of the remaining peroxymonosulphuric acid, and after a period of from 10 to 30 minutes introducing the remainder of the peroxymonosulphuric acid, and after a further period of from 10 to 30 minutes after the third stage of introduction of peroxymonosulphuric acid separating precipitated manganese salt from solution.

15. A process for recovering manganese from an aqueous acidic sulphate solution containing manganese and one or more of zinc, nickel, cobalt and iron comprising the steps of introducing into the solution from a 110 to 160% of the stoichiometric amount of permonoxulphuric acid to oxidise all the manganese to the Mn (IV) oxidation state in total and sufficient neutralising agent to neutralise the peroxymonosulphuric acid by first introducing into solution from 30 to 50% of the peroxymonosulphuric acid, then immediately introducing all the neutralising agent, from 5 to 30 minutes thereafter introducing from one third to one half, of the remaining peroxymonosulphuric acid, after a period of from 10 to 30 minutes introducing half the remainder of the peroxymonosulphuric acid and after a period of from 10 to 30 minutes introducing the remainder of the peroxymonosulphuric acid, and after a further period of from 10 to 30 minutes after the fourth stage of introduction of peroxymonosulphuric acid separating precipitated manganese salt from solution.

* * * * *